United States Patent
Maier

[15] 3,695,193
[45] Oct. 3, 1972

[54] FERTILIZER APPLYING APPARATUS

[72] Inventor: Gary H. Maier, Des Moines, Iowa
[73] Assignee: Ferti-Feeder, Inc., Des Moines, Iowa
[22] Filed: March 30, 1970
[21] Appl. No.: 23,908

[52] U.S. Cl. .........................111/93, 111/96, 111/99
[51] Int. Cl. ...............................................A01c 5/02
[58] Field of Search...........111/93, 89, 92, 95, 1, 7.2, 111/25, 90, 34, 99; 222/176, 561, 413

[56] References Cited

UNITED STATES PATENTS

| | | | |
|---|---|---|---|
| 3,109,393 | 11/1963 | Dion | 111/89 |
| 2,325,939 | 8/1943 | Buehler | 111/96 |
| 687,673 | 11/1901 | Bromley | 111/25 |
| 2,619,055 | 11/1952 | Abel et al. | 111/7.1 |

*Primary Examiner*—Robert E. Pulfrey
*Assistant Examiner*—Stephen C. Pellegrino
*Attorney*—Rudolph L. Lowell

[57] ABSTRACT

The apparatus is comprised of a portable fertilizer container formed with a forwardly and downwardly shaped bottom wall that has a discharge opening located adjacent the front end of the container. A frame structure on the container supports a motor and a motor driven hole-boring auger which is located forwardly of the container. A discharge chute directs material from the discharge opening into a bored hole on axial movement of the auger to an elevated position above the lower terminal end of the chute. Flow of material into the hole is controlled by a valve means that is operable to open and close the discharge opening.

5 Claims, 7 Drawing Figures

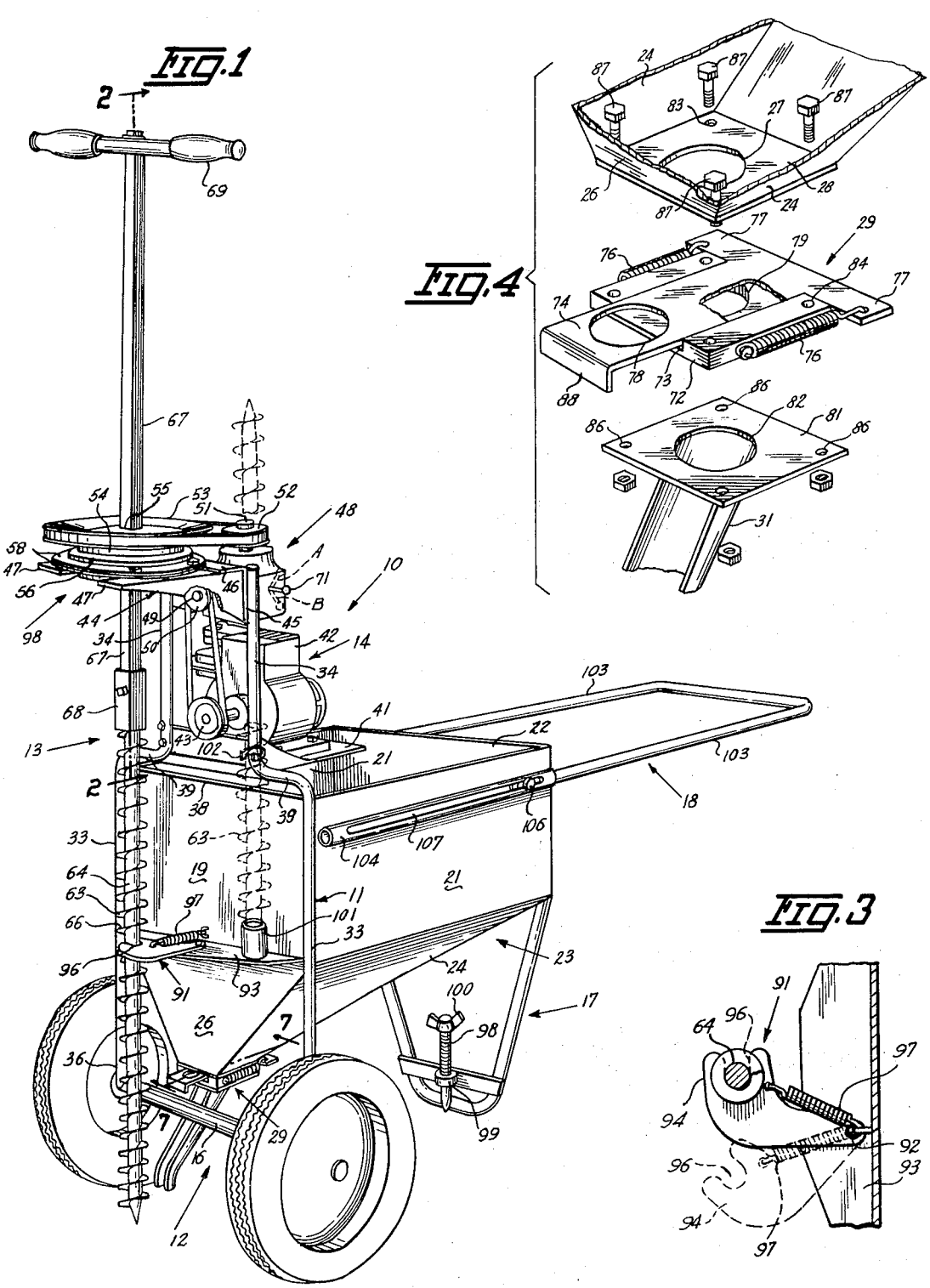

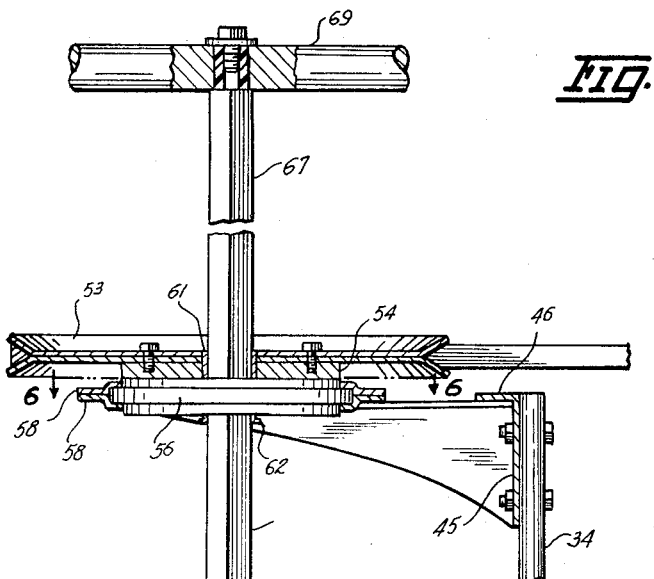
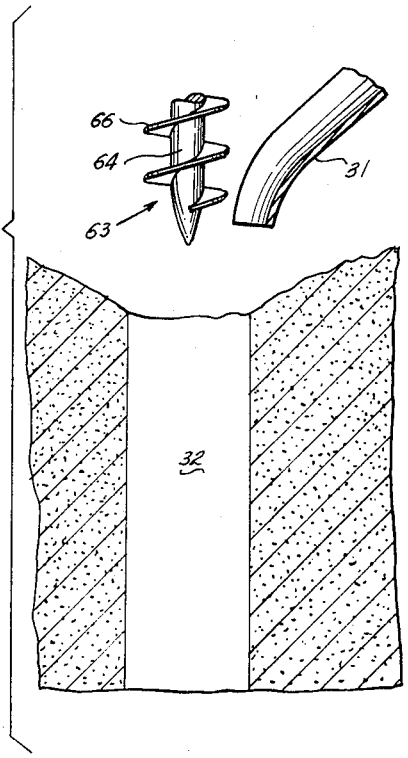
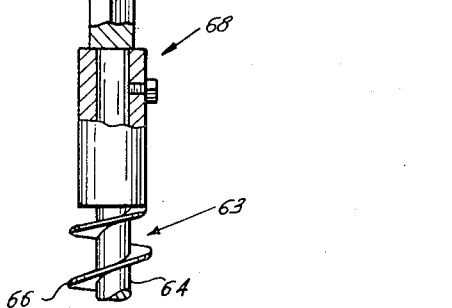
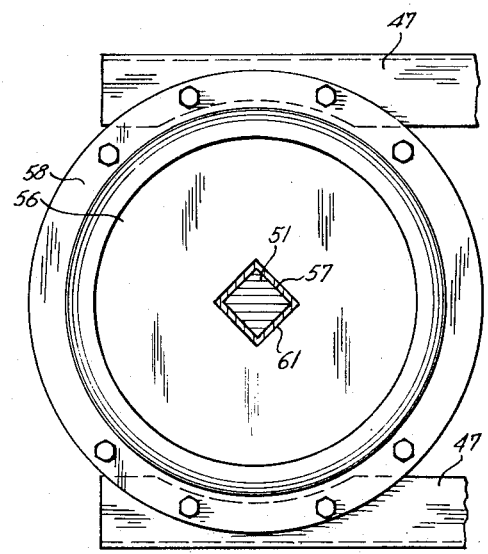
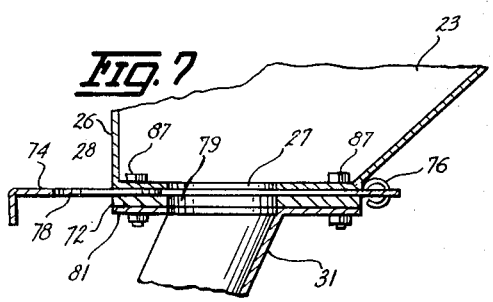

FERTILIZER APPLYING APPARATUS

SUMMARY OF THE INVENTION

The fertilizer applying apparatus is of a compact construction readily transported from job to job and easily maneuverable on a job to material applying locations. The auger is operable to bore a hole in the soil to a desired depth, and is removable from the bored hole to provide for material from the container being supplied directly into the hole without requiring any maneuvering of the apparatus relative to the hole. The apparatus thus operates efficiently to apply fertilizer to soils of various characteristics in a minimum of time and with a minimum of manual effort.

BRIEF DESCRIPTION OF THE DRAWINGS

FIG. 1 is a front perspective view of the fertilizer applying apparatus of this invention;

FIG. 2 is an enlarged foreshortened sectional view taken along line 2 — 2 in FIG. 1;

FIG. 3 is an enlarged detail plan view of a latch member for supporting the hole boring auger;

FIG. 4 is an exploded perspective view of the valve means for controlling the discharge of material from a container therefor into a bored hole;

FIG. 5 is a detail view, partly in section, showing the positions of the auger and material discharge chute relative to a bored hole during a material discharge operation;

FIG. 6 is an enlarged sectional view as seen on line 6 — 6 in FIG. 2; and

FIG. 7 is an enlarged sectional view taken on line 7 — 7 in FIG. 1 showing the assembly of the material valve control means with the material container and the discharge chute.

DETAILED DESCRIPTION OF THE INVENTION

The fertilizer applying apparatus of this invention is illustrated in FIG. 1 as including a container 10 for a fertilizer or plant food material secured to an upright frame structure 11 having its lower end mounted on a wheel and axle assembly 12. The frame structure 11 supports an auger assembly 13 and an operating motor 14 therefor at positions above the container 10 for drilling a hole in the ground at a position forwardly of the axle 16 of the wheel and axle assembly 12. The rear end of the container is ground supported on a leg or stand member 17 and the apparatus is maneuverable by a handle unit 18 secured to and extended rearwardly from the container 10.

The container is of a generally box shape having a front wall 19, side walls 21 and a rear wall 22. The bottom wall 23 is of what may be termed a hopper construction and has downwardly and forwardly converged sections 24 and an upright front section 26. Adjacent the front section 26 the converged sections 24 terminate in a horizontal floor section 28 to provide for the gravity movement of the material in the container through a discharge opening 27 formed in the floor section 28 (FIG. 4) As shown in FIG. 1 the front section 26 forms a downward extension of the container front wall 19. The discharge of material from the opening 27 is controlled by a valve unit 29 mounted on the floor section 28. From the discharge opening 27 the material falls into a chute or slide 31 for delivery into a hole 32 (FIG. 5) formed by the auger assembly 13.

The frame structure 11 for supporting the container 10 is of an irregular inverted U-shape having side or leg sections 33 and an upper connecting or base section 34. The lower ends 36 of the legs 33 (FIG. 1) are secured as by weldments to the wheel axle 16. From the axle 16 the legs 33 extend upwardly in a spaced apart parallel relation adjacent corresponding ends of the container front wall 19 to positions adjacent to and above the upper side 38 of the front wall 19. At this level the legs 33 are laterally extended or bent inwardly toward each other, as indicated at 39, and then projected upwardly in a spaced parallel relation for connection to the base section 34. The upright frame 11 is of a one piece construction formed of a pipe material.

A motor mounting plate or lower shelf member 41 is secured to and projects horizontally rearwardly from the frame 11 at the leg lateral sections 39. The shelf member 41 overlies the front portion of the container 10 and supports an engine 42 of internal combustion type which has a drive pulley 43 positioned adjacent to and forwardly of the frame structure 11. An upper mounting bracket 44 includes an upright plate 45 extended between and secured to the side legs 33 and having a forwardly projected lip 46 at its upper end. A pair of supports 47, secured as by weldments to opposite ends of the plate 45, extend forwardly from the frame 11 with their upper surfaces underlying the lip 46.

Attached to and arranged rearwardly of the upright plate 45 is a transmission unit 48 that has a horizontal input shaft 49 extended through a notch in plate 45 and provided with a pulley 50 for belt connection with the engine drive pulley 43. A vertically extended output shaft 51 for the transmission unit 48 has a horizontal drive pulley 52 in belt connection with a driven pulley 53 operatively associated with the auger assembly 13.

The auger pulley 53 (FIG. 2) is of a stamped metal type that includes an attached hub 54 formed with an axial bore 55 of a square shape in transverse cross section. A bearing unit 56 for rotatably supporting the auger pulley 53 has an axial bore 57 of a square shape in transverse section corresponding to the bore 55 in the pulley hub 54 (FIG. 6) The bearing unit 56 is mounted in a pair of clamping plates 58 which are supported on and secured to the supports 47 of the mounting bracket 44.

Extended through the axial bores 55 and 57 in the hub 54 and bearing unit 56, respectively, is a sleeve insert 61 of a square shape in transverse cross section having one end secured to the hub 54, as by weldments or the like, and the other end thereof peened or capped, as indicated at 62. The insert thus acts to hold the hub 54 to the bearing portion of the bearing unit 56.

The auger assembly 13 (FIGS. 1 and 2) includes an auger 63 having a shaft 64 and a flighting 66. Connected to the upper end of the auger shaft 64 and in axial alignment therewith is a shaft extension 67 of a square shape for reception in a mating relation within the insert 61. The auger shaft 64 and shaft extension 67 are releasably connected together by a coupler unit 68. On rotation of the auger pulley 53 the auger 63 is rotated by the coacting engagement of the shaft extension 67 with the insert 61 while permitting axial movement of the auger 63 relative to the auger pulley 53. This axial movement is manually accomplished through a handle member 69 mounted on the upper end of the auger shaft extension 67. The transmission unit 48 is of a type that includes a clutch lever 71 which is movable from a neutral position, shown in full lines in FIG. 1, to positions A and B, shown in dotted lines, providing for a reversed rotation of the auger 63.

The valve unit 29 for controlling the discharge of the material from the container 10 into the hole 32 formed by the auger 63 includes a base plate 72 (FIG. 4) having a guideway 73 for slidably receiving a flat valve member 74 of a generally T-shape in plan view. A pair of coil springs 76 have one of their ends connected to opposite sides of the base plate 72 and their opposite ends connected to the cross arm 77 of the T-shape valve member 74. The springs 76 are arranged in tension so as to yieldably hold the cross arm 77 in abutting engagement with the adjacent end of the base plate 72.

The valve member 74 and the bottom wall of the guideway 73 are formed with openings 78 and 79, respectively, corresponding in size to the discharge opening 27 formed in the floor section 28 of the container bottom wall 23. The discharge chute 31 is of a U-shape in transverse cross section so as to form an open faced trough over its complete length. The chute 31 has its upper end secured to a mounting plate 81 that has an opening 82 in registration with the upper end of the chute. The floor section 28 base plate 72, and mounting plate 81 are formed with corresponding bolt receiving holes 83, 84 and 86, respectively. With the base plate 72 sandwiched between the floor section 28 and mounting plate 81, the discharge chute 31 and base plate 72 are secured to the underside of the floor section 28 by bolts 87 inserted through corresponding aligned holes 83, 84 and 86.

With the valve unit 29 (FIG. 7) thus assembled with the discharge chute 31 and floor section 28, the discharge opening 27 is in axial alignment with the holes 79 and 82 in the base plate 72 and mounting plate 81, respectively. With the cross arm 77 of the valve member 74 held in engagement with the adjacent end of the base plate 72 by the coil springs 76 the opening 78 thereof is in a position out of registration with the opening 79 in the base plate 72. On manually pushing the end 88 of the valve member 74 the valve member is moved against the action of the springs 76, to a position defined by the engagement of its end 88 with the adjacent side of the mounting member 72, wherein the hole 78 is in registration with the already aligned openings 27, 79 and 82. With all four of the openings 27, 78, 79 and 82 thus aligned, material from the container 10 is permitted to fall by gravity into the chute 31 for discharge into the bored hole 32.

The length of the discharge chute 31 and its downward and forward inclination from the opening 82 is determined relative to the axial path of the auger 63 such that when the auger is elevated above the hole 32 (FIG. 5) the terminal or lower end of the chute 31 will discharge material directly into the hole 32. During this discharge operation the auger 63 is held in an elevated position by an auger holding or latch member 91 (FIG. 3) extended horizontally and pivoted at one end 92 on a supporting plate 93 projected forwardly from the lower end of the container front wall 19. The opposite end 94 of the holding member 91 is swingable into and out of the axial path of movement of the auger 63 and is formed with a notch 96 for receiving the auger shaft 64. With the shaft 64 within the notch 96 the auger 63 is supported against axial movement by engagement of its flighting 66 with opposite sides of the latch member 91. A coil spring 97 is connected to the latch end 94 and to the container front wall 19 so as to act in an over center relation to hold the member 91 in either an auger engaging position shown in full lines in FIG. 3, or an auger nonengaging position as shown in dotted lines.

In use the apparatus is moved to a location for the drilling of a hole 32 into the ground surface with the leg 17 supported on the ground. A threadable stake 98 threadable in an associated nut 99 supported adjacent the lower end of the leg 17 and inwardly thereof is anchored in the ground by manipulation of a wing finger grip 100. This staking of the leg support 17 prevents the apparatus from turning on the wheels of the assembly 12 during the drilling action of the auger 63.

The latch 91 is then moved to its dotted line position shown in FIG. 3 to provide for a free axial movement of the auger 63 relative to the ground surface. With the engine 42 in operation the clutch lever 71 is moved from its neutral position, indicated in full lines in FIG. 1, to its dotted line position A providing for a screwing of the auger 63 into the ground. By pressing downwardly on the handle 69 of the auger shaft extension 67 the auger is fed into the ground to a desired depth. With the hole 32 completed the clutch lever 71 is moved from its dotted line position A in FIG. 1, to the dotted line position B, to reverse the rotation of the auger to facilitate its withdrawal from the hole 32. Rotation of the auger 63 is then discontinued by movement of the clutch lever 71 to its full line position in FIG. 1 and the latch member 91 is moved into engagement with the auger to maintain it in an elevated position above the hole 32 (FIG. 5). The valve member 74 is then manipulated against the action of the coil springs 76 to register the hole 78 with the discharge opering 27 in the container floor section 28, and the hole 79 and 82 in the base plate 73 and mounting plate 81, respectfully. Material from the container 10 is thus permitted to flow freely to the discharge chute 31 and directly into the bored hole 32. The trough shape of the discharge chute 31 eliminates any clogging or arching of the material in the chute so that on release of the valve member 74 the springs 76 provide for an immediate cut-off of material dropping from the container 10 into the chute 31. It will also be apparent that since no material remains in the chute 31 the apparatus can be moved from location to location without spillage or dribbling of material between locations.

In the transport of the apparatus from job to job the auger shaft 64 is disconnected from the shaft extension 67 and the extension 67 permitted to drop through the bearing unit 56 until the handle 69 engages the top surface of the pulley 53. The auger 63 is then inverted and its shaft 64 received within a tubular sleeve 101 secured to the plate 93 such that the auger 63 extends upwardly, as shown in dotted lines in FIG. 1, at a position adjacent the upper end of a frame leg 33. The auger 63 is maintained in this position by a locking clip 102 secured to the frame 11.

The handle 18 is of a U-shape having legs 103 telescopically receivable within corresponding tubular holders 104 secured to the outside of the container side walls 21. Each handle leg 103 adjacent the free end thereof has a holding screw 106 which is slidable within an elongated slot 107 formed in a corresponding tubular holder 104. For transport purposes the handle 18 is moved toward the container 10 to telescope the legs 103 within the tubular holders 104.

I claim:

1. An apparatus for supplying a plant food material to the roots of a tree or the like comprising:
   a. a portable frame having a fertilizer container mounted thereon,
   b. said container having a bottom wall converged downwardly toward one end of the container and formed with a discharge opening adjacent said one end,
   c. an upright auger spaced outwardly from said one end of the container,
   d. means on said container supporting said auger for rotational and axial movement to bore a hole in the soil,
   e. a material discharge chute secured to said bottom wall for directing material from said discharge opening into said hole, said chute being constructed as an open inclined trough opening in the direction of the axis of said auger whereby clogging and arching of the material in the chute is prevented, said chute having a discharge end spaced inwardly from the axis of said auger, and
   f. valve means for opening and closing said discharge opening 2. The apparatus for supplying a plant food material to the roots of a tree according to claim 1, wherein:
   a said discharge chute is of a U-shape in transverse cross section inclined downwardly from said discharge opening to a position adjacent the peripheral path of movement of said auger and the upper end of the bored hole.

3. An apparatus for supplying a plant food material to the roots of a tree or the like comprising:
   a. a portable frame having a fertilizer container mounted thereon,
   b. said container having a bottom wall converged downwardly toward one end of the container and formed with a discharge opening adjacent said one end,
   c. an upright auger spaced outwardly from said one end of the container,
   d. means on said container supporting said auger for rotational and axial movement to bore a hole in the soil,
   e. a material discharge chute secured to said bottom wall for directing material from said discharge opening into said hole, said chute having a discharge end spaced inwardly from the axis of said auger, and
   f. valve means for opening and closing said discharge opening, wherein
   said container includes: a front wall at said one end thereof;
   a frame secured to and projected upwardly from said front wall,
   a lower horizontal platform secured to and extended rearwardly from said frame adjacent the upper end of said front wall, and
   an upper horizontal bracket means secured to and extended forwardly from the upper end of said frame,
   a motor on said lower platform,
   wherein said auger supporting means is mounted on said bracket means, and wherein
   power transmission means are provided for connecting said auger in a driven relation with said motor.

4. An apparatus for supplying a plant food material to the roots of a tree or the like comprising:
   a. a portable frame having a fertilizer container mounted thereon,
   b. said container having a bottom wall converged downwardly toward one end of the container and formed with a discharge opening adjacent said one end,
   c. an upright auger spaced outwardly from said one end of the container,
   d. means on said container supporting said auger for rotational and axial movement to bore a hole in the soil,
   e. a material discharge chute secured to said bottom wall for directing material from said discharge opening into said hole, said chute having a discharge end spaced inwardly from the axis of said auger,
   f. valve means for opening and closing said discharge opening,
   g. a support secured to and projected outwardly from the one end of said container,
   h. a pivoted auger-holding member pivotally mounted on said support with the free end portion thereof swingably movable in a horizontal plane across the path of axial movement of said auger,
   i. means on said free end portion engageable with said auger to hold the auger out of a bored hole when material is being directed into said hole by the discharge chute, and
   j. means for yieldably holding said free end portion in a first auger engaging position or a second auger non-engaging position.

5. An apparatus for supplying a plant food material to the roots of a tree or the like comprising:
   a. a portable frame having a fertilizer container mounted thereon,
   b. said container having a bottom wall converged downwardly toward one end of the container and formed with a discharge opening adjacent said one end,
   c. an upright auger spaced outwardly from said one end of the container, said auger having a shaft,
   d. means on said container supporting said auger for rotational and axial movement to bore a hole in the soil,
   e. a material discharge chute secured to said bottom wall for directing material from said discharge opening into said hole, said chute having a discharge end spaced inwardly from the axis of said auger,
   f. valve means for opening and closing said discharge opening,
   g. a support secured to and projected outwardly from the one end of said container at a position adjacent the lower end of the container, h. an upright extension for said shaft mounted in said auger supporting means,
i. a coupler unit for releasably connecting said shaft and said shaft extension in axial alignment, and
j. an upright shaft holding socket on said support adjacent said container, k. said auger, on disconnection of the shaft therefor from said shaft extension, being inverted for placement of the upper end thereof within said socket for transport of said apparatus.

* * * * *